(12) United States Patent
Fleck et al.

(10) Patent No.: US 12,194,779 B2
(45) Date of Patent: Jan. 14, 2025

(54) SYSTEMS AND METHODS FOR IDENTIFYING AND MITIGATING LUG NUT LOOSENING

(71) Applicant: MOOCHOUT LLC, St. Paul, MN (US)

(72) Inventors: Jonathan E. Fleck, St. Paul, MN (US); Joseph J. Calhoun, St. Paul, MN (US)

(73) Assignee: MOOCHOUT LLC, St. Paul, MN (US)

( * ) Notice: Subject to any disclaimer, the term of this patent is extended or adjusted under 35 U.S.C. 154(b) by 619 days.

(21) Appl. No.: 17/604,596

(22) PCT Filed: Apr. 16, 2020

(86) PCT No.: PCT/US2020/028565
§ 371 (c)(1),
(2) Date: Oct. 18, 2021

(87) PCT Pub. No.: WO2020/214840
PCT Pub. Date: Oct. 22, 2020

(65) Prior Publication Data
US 2022/0194122 A1    Jun. 23, 2022

Related U.S. Application Data

(60) Provisional application No. 62/834,861, filed on Apr. 16, 2019.

(51) Int. Cl.
*B60B 3/16* (2006.01)
(52) U.S. Cl.
CPC ........ *B60B 3/165* (2013.01); *B60B 2310/306* (2013.01); *B60B 2310/316* (2013.01); *B60B 2900/3316* (2013.01)

(58) Field of Classification Search
CPC ..................................................... B60B 3/165
See application file for complete search history.

(56) References Cited

U.S. PATENT DOCUMENTS

| | | | |
|---|---|---|---|
| 5,294,189 A | 3/1994 | Price et al. | |
| 9,389,149 B2 * | 7/2016 | Paulin | B60R 25/102 |
| 10,428,861 B2 * | 10/2019 | Mason | B60B 3/165 |

(Continued)

OTHER PUBLICATIONS

International Search Report and Written Opinion of the International Searching Authority for PCT/US2020/028565 dated Aug. 14, 2020 (11 pages).

*Primary Examiner* — Jason R Bellinger
(74) *Attorney, Agent, or Firm* — Polsinelli PC

(57) ABSTRACT

Implementations disclosed and claimed herein provide systems and methods for identifying and mitigating lug nut loosening. In one implementation, an indicator body of an indicator has a top surface connecting a front surface and a back surface. A first side of the indicator body is disposed opposite a second side of the indicator body. A receiver extends from the top surface into an interior of the indicator body. The receiver is configured to form a translational relationship of the lug nut with the indicator through a mating fit of the lug nut within the receiver. The translational relationship generates a corresponding rotation of the indicator body in response to a rotation of the lug nut. The corresponding rotation of the indicator body provides an indication that the lug nut is loose.

20 Claims, 16 Drawing Sheets

(56) References Cited

U.S. PATENT DOCUMENTS

| | | |
|---|---|---|
| 2011/0250036 A1 | 10/2011 | Boyce et al. |
| 2018/0232966 A1 | 8/2018 | Ellis |
| 2020/0016926 A1* | 1/2020 | Marczynski ............... B60B 3/16 |
| 2021/0362541 A1* | 11/2021 | Davies ..................... G01K 1/14 |

* cited by examiner

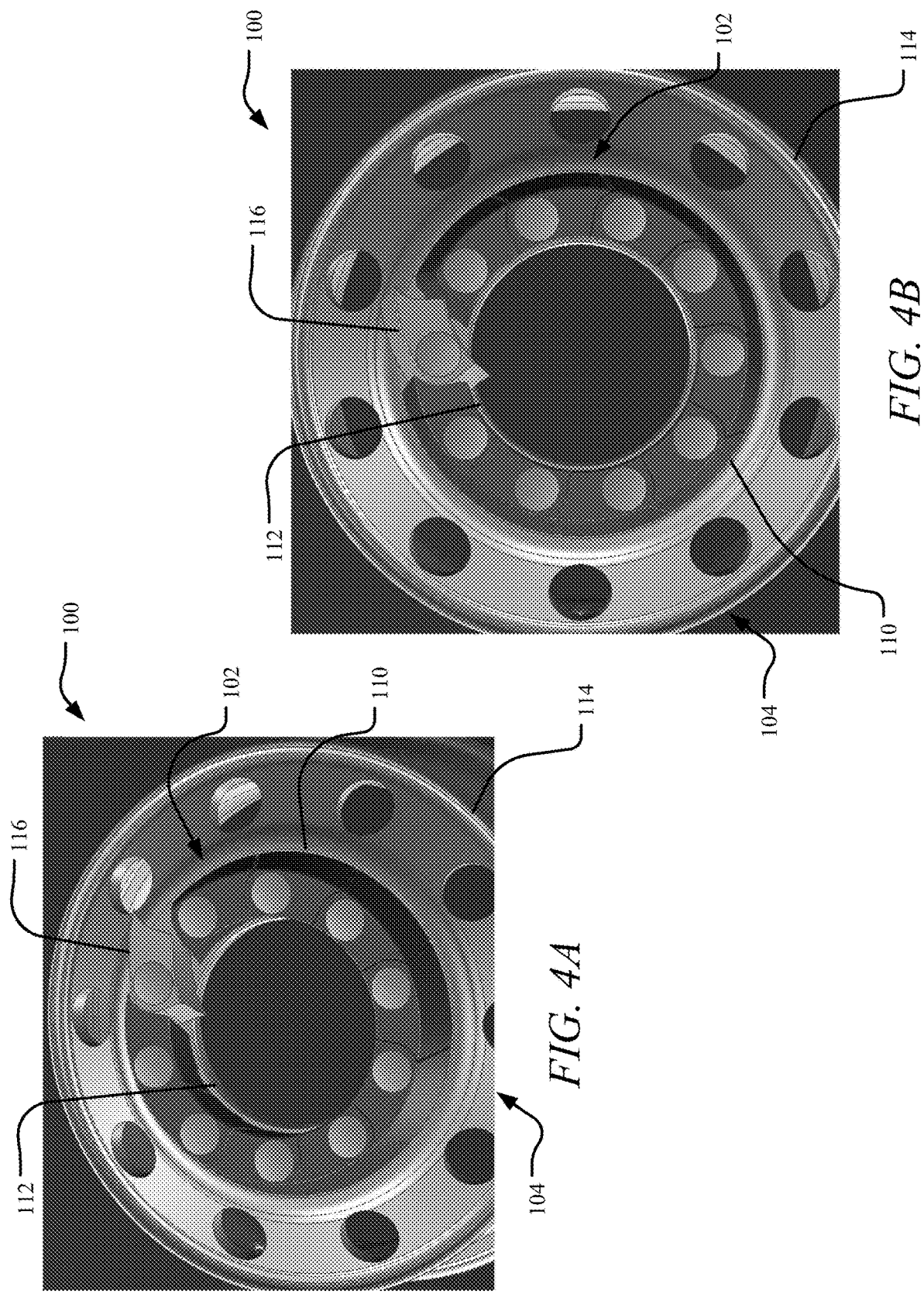

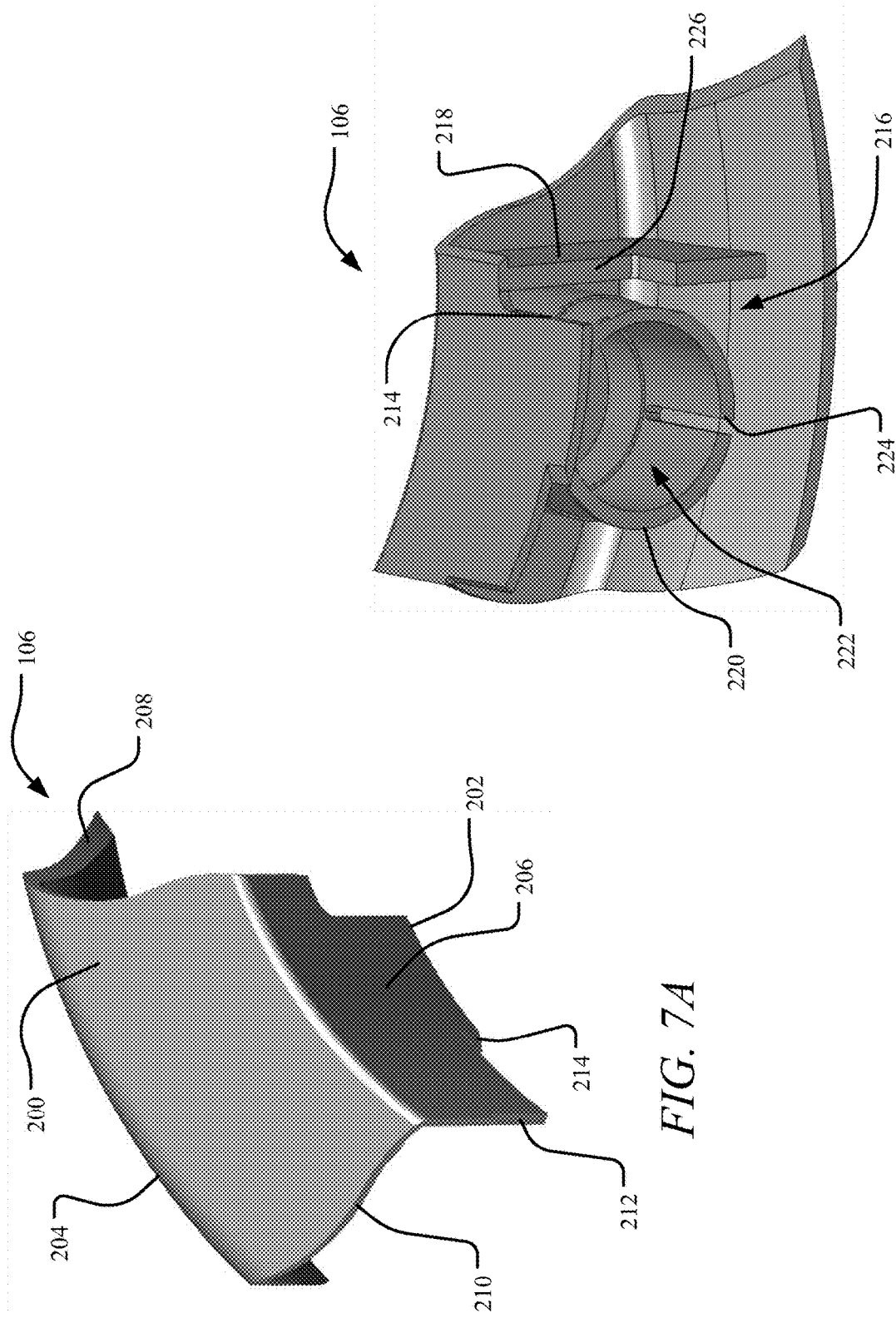

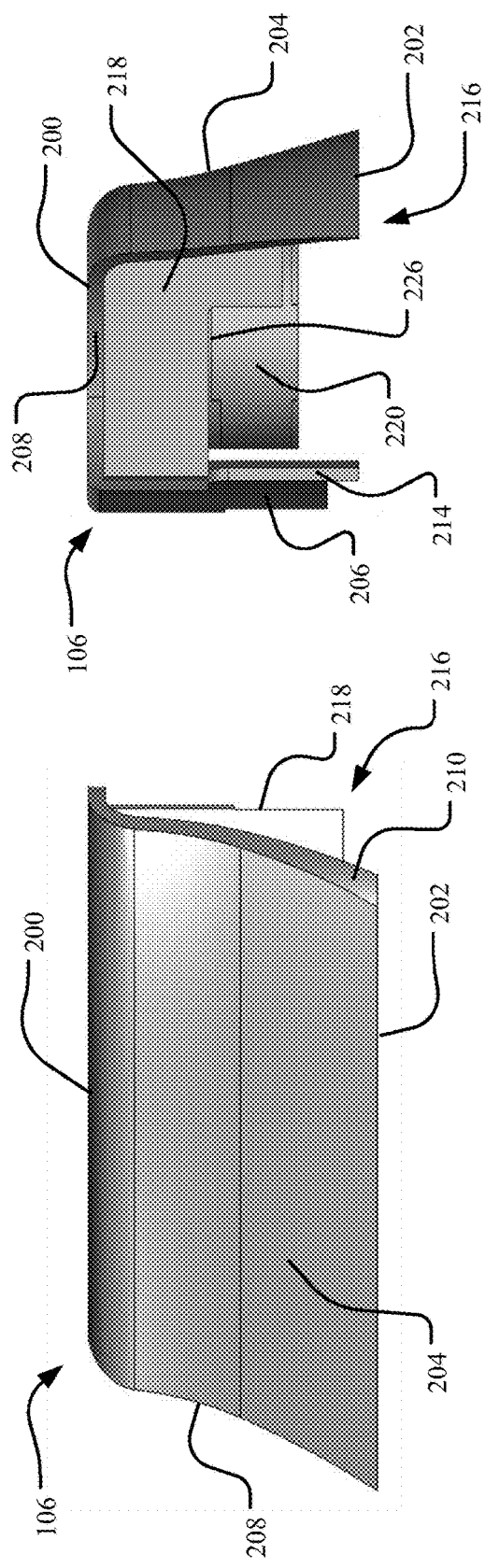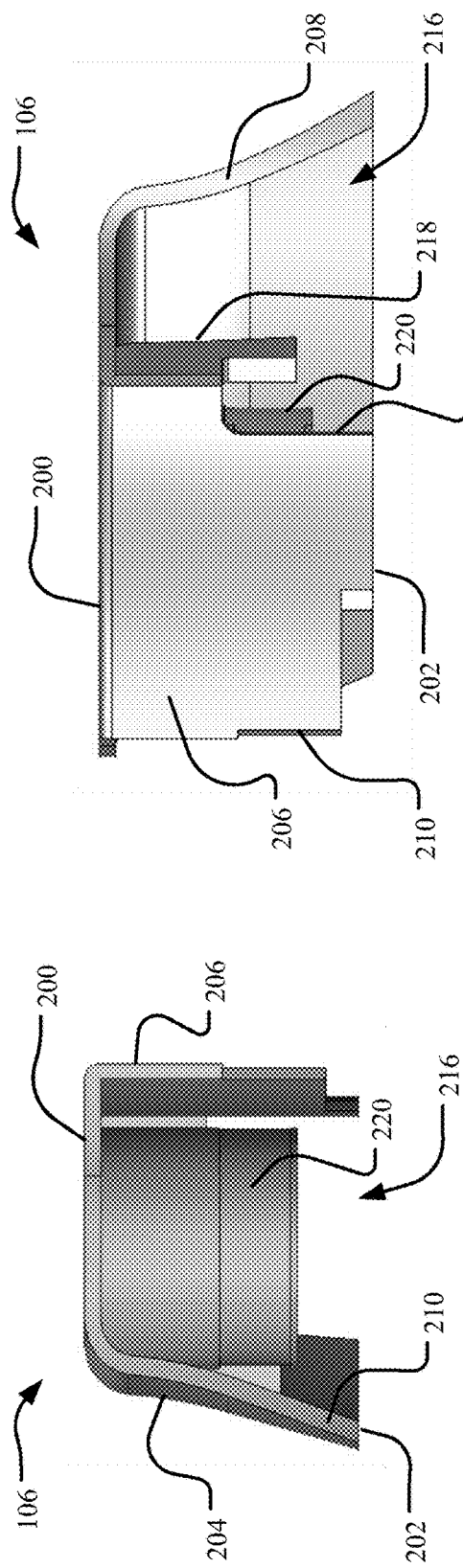

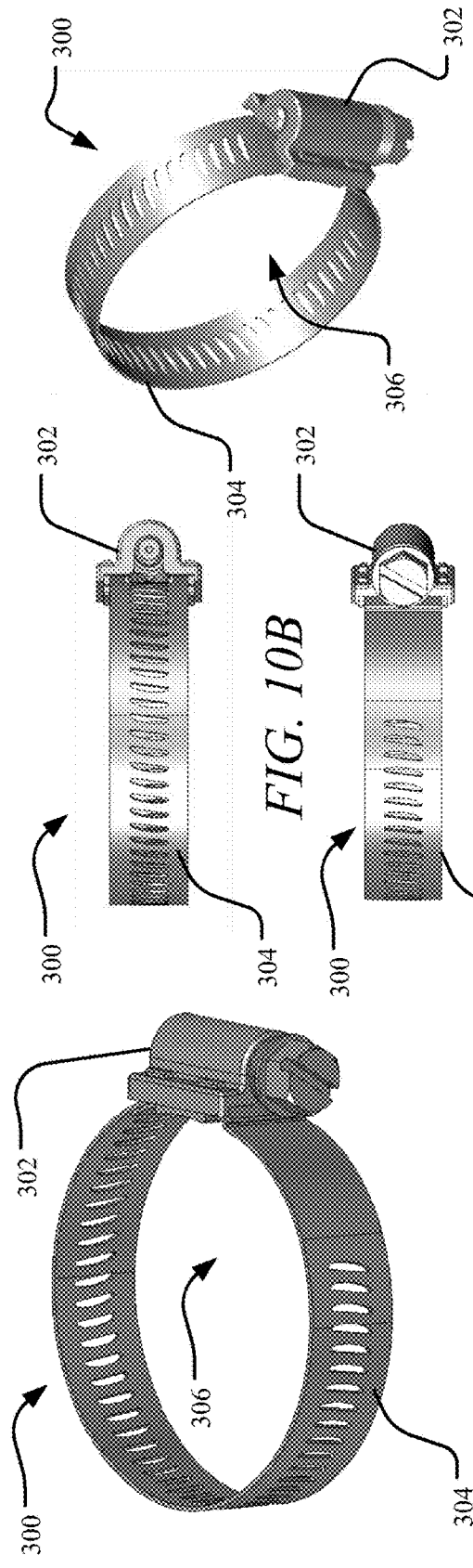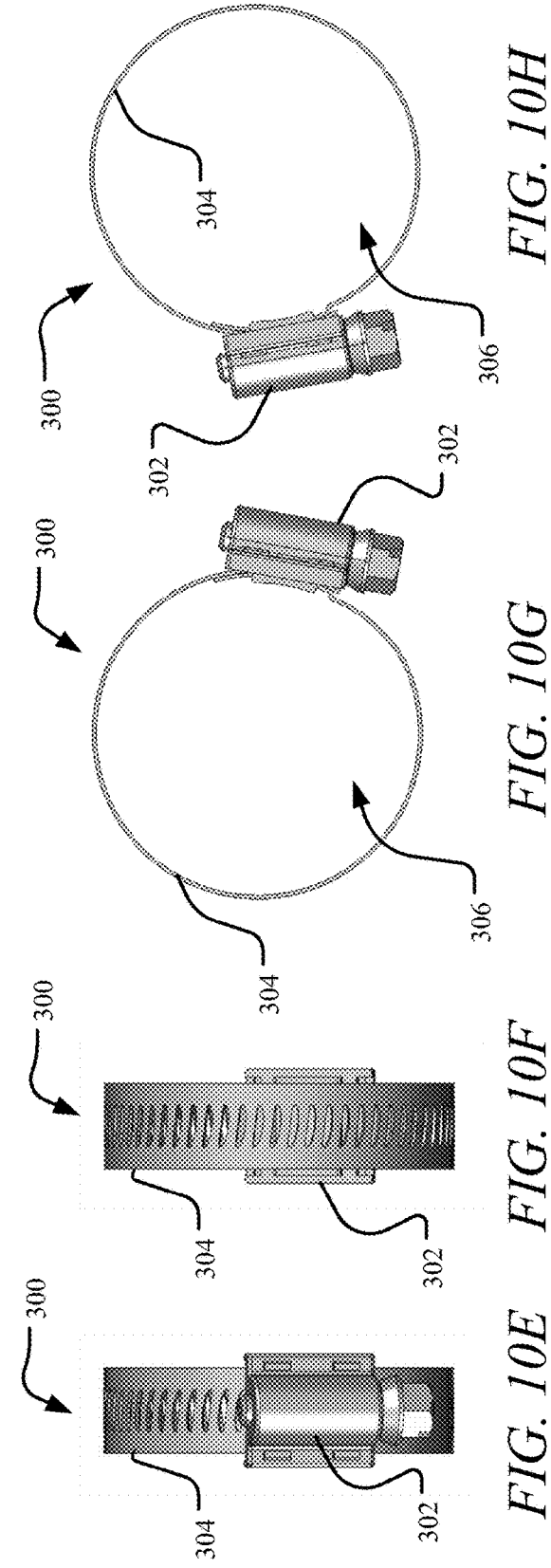
FIG. 10A FIG. 10B FIG. 10C FIG. 10D FIG. 10E FIG. 10F FIG. 10G FIG. 10H

SYSTEMS AND METHODS FOR IDENTIFYING AND MITIGATING LUG NUT LOOSENING

CROSS-REFERENCE TO RELATED APPLICATIONS

The present application claims the benefit of priority to U.S. Provisional Application No. 62/834,861, entitled "Aerodynamic Lug Nut Indicator" and filed on Apr. 16, 2019, which is specifically incorporated by reference herein in its entirety.

TECHNICAL FIELD

Aspects of the present disclosure relate to systems and methods for identifying loose lug nuts in a vehicle wheel, and more particularly to an aerodynamic indicator system that mitigates forces that loosen lug nuts during operation of a vehicle, while facilitating identification of a loose lug nut.

BACKGROUND

During operation of a vehicle (e.g., heavy trucks, trailers, etc.) typically, various forces may cause one or more lug nuts of a wheel of the vehicle to loosen. These forces may include, for example: vibrational forces as the vehicle travels along a road or path; drag forces on the lug nuts and other wheel components, including those caused by aerodynamic inefficiencies of the lug nuts (e.g., through the paddle-wheel-effect emanating from uneven surfaces and pockets with sharp corners, etc.); and/or the like. The impact of a loose lug nut may range from the minor impact of fuel inefficiencies and damage over time to the wheel, vehicle alignment, or vehicle to the catastrophic impact of an accident due to the wheel decoupling from the vehicle.

Conventional devices include an arrow that is inserted over each lug nut to indicate whether the lug nut has loosened. However, not only do these conventional systems involve memorization of an original position of each arrow to determine whether any loosening occurred, thereby complicating installation and detection, such conventional systems fail to address the drag forces causing the loosening, with some even increasing aerodynamic inefficiencies, for example through the paddle-wheel-effect.

It is with these issues in mind, among others, that various aspects of the present disclosure were developed.

SUMMARY

Implementations described and claimed herein address the foregoing issues by providing systems and methods for identifying and mitigating lug nut loosening. Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIG. 4A-4B show the indicator system indicating that a lug nut of the wheel is loose.

FIGS. 7A-7B show top perspective and bottom perspective views, respectively, of an example indicator body of the indicator.

FIGS. 9A-9D show front, left side, right side, and back views, respectively, of the indicator body.

FIGS. 10A-10H are top perspective, front, back, perspective, right side, left side, top, and bottom views, respectively, of an example clamp of the indicator system.

DETAILED DESCRIPTION

Figure 1:
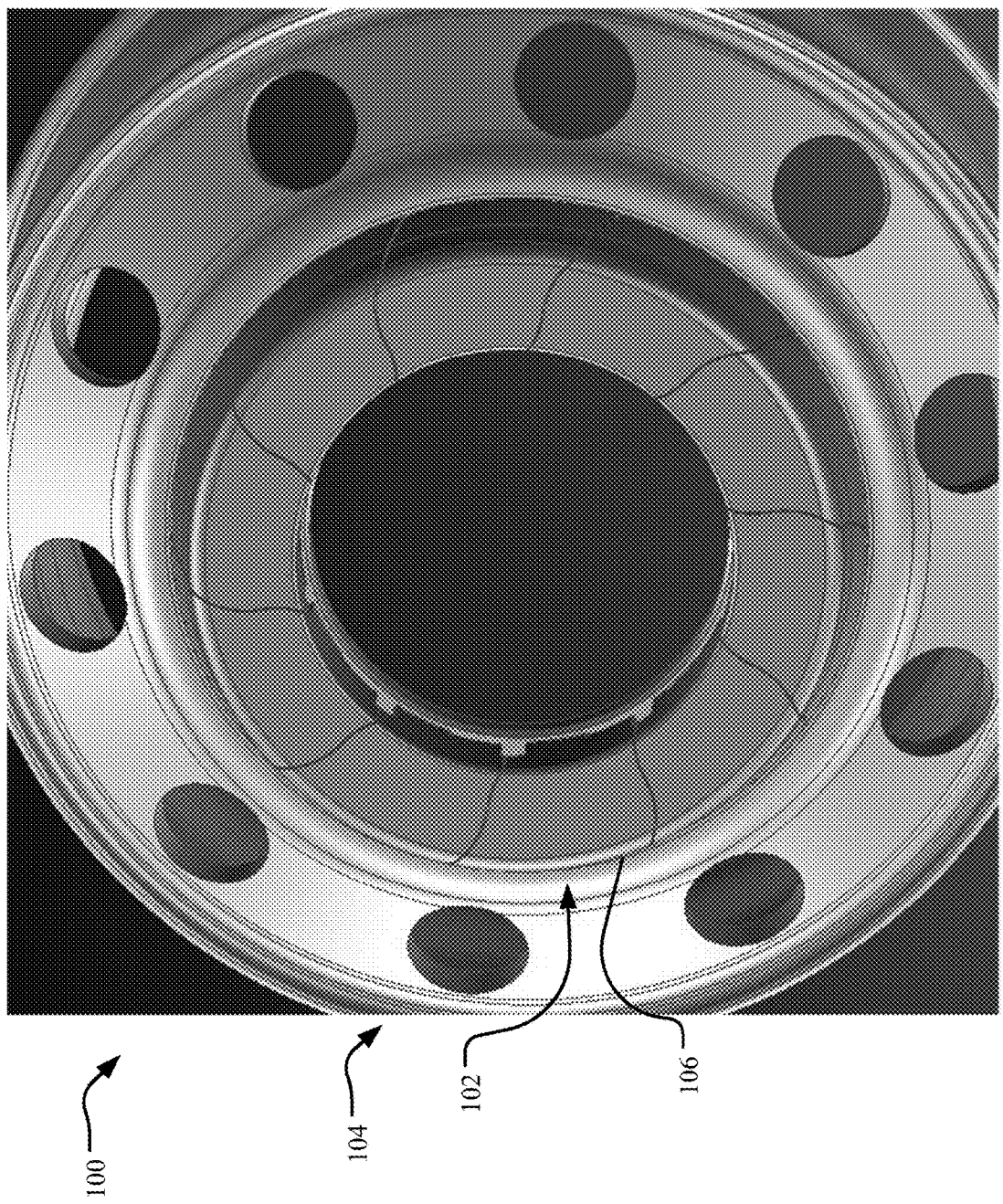
FIG. 1 illustrates a perspective view of an example indicator system installed on a wheel.

Aspects of the present disclosure involve systems and methods for indicating, mitigating, and tracking lug nut loosening of one or more lug nuts of a wheel of a vehicle. In one aspect, an indication system includes a plurality of indicator bodies, each coupled to a respective lug nut using a sleeve and a clamp. In another aspect, each of the indicator bodies is coupled to a respective lug nut through an interference fit with a lock of the indicator system. In any case, the indicator body is mounted to the lug nut, such that any movement of the lug nut is translated to the indicator body. For example, if the lug nut is loosened through rotational movement, the rotational movement of the lug nut translates to the indicator body in a manner that visually reflects the rotation of the lug nut.

Each of the indicator bodies may house a corresponding lug nut, mitigating drag forces on the lug nut during operation of the vehicle. The plurality of indicator bodies may be arranged in an aerodynamic configuration that reduces drag forces on the indicator system. For example, the plurality of indicator bodies may be arranged with sides of each indicator body meeting sides of adjacent indicator bodies to form a concentric ring. The sides of adjacent indicator bodies meet, such that individual indicator bodies are permitted to rotate relative to the concentric ring in response to rotation of the corresponding lug nut. The rotation of an individual indicator body relative to the concentric ring provides a visual indication that the corresponding lug nut is loose. The relationship of the indicator bodies relative to each other in the concentric ring may mitigate further loosening of a lug nut by preventing the rotated indicator body from rotating further.

As such, the indication system of the presently disclosed technology increases aerodynamic efficiency of a wheel, while mitigating and identifying lug nut loosening. The indication system is low cost, lightweight, durable, easily-installed, low maintenance, and provides an indication of lug nut movement that is self-aligning and easily visible. The indication system may be customized for a front wheel of a vehicle to particularly address the paddle-wheel-effect or used universally on any vehicle wheel. Additionally, the indication system may include one or more sensors communicating with a tracking system that provides remote notifications or alerts regarding loose lug nuts, which may be used to alert a driver to a potentially hazardous condition or to generate analytics, among other uses. Other advantages and features of the presently disclosed technology will be apparent from the present disclosure.

To begin a detailed description of an example indicator system 100, reference is made to FIGS. 1-4B. In one implementation, the indicator system 100 includes a plurality of indicators 102 mounted on corresponding lug nuts on a wheel 104 of a vehicle. The vehicle may be, without limitation, a commercial truck, passenger car, truck, Sports Utility Vehicle (SUV), trailer, Recreational Vehicle (RV), and/or the like. The lug nuts may be threaded onto a stud of a front wheel, rear wheel, double rear wheel, and/or the like.

Figure 2:
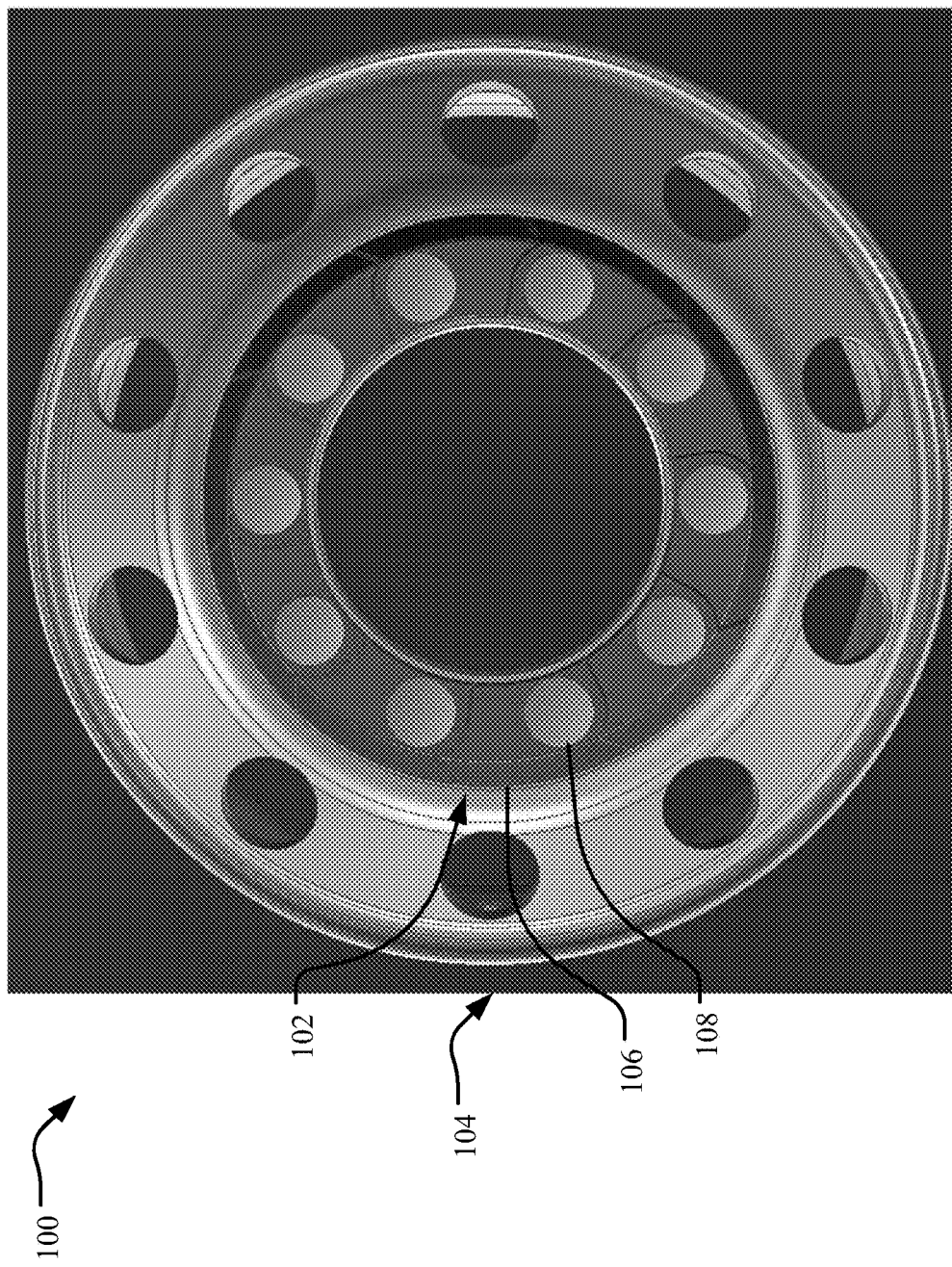
FIG. 2 shows a front view of the indicator system installed on the wheel.
Figure 3B:
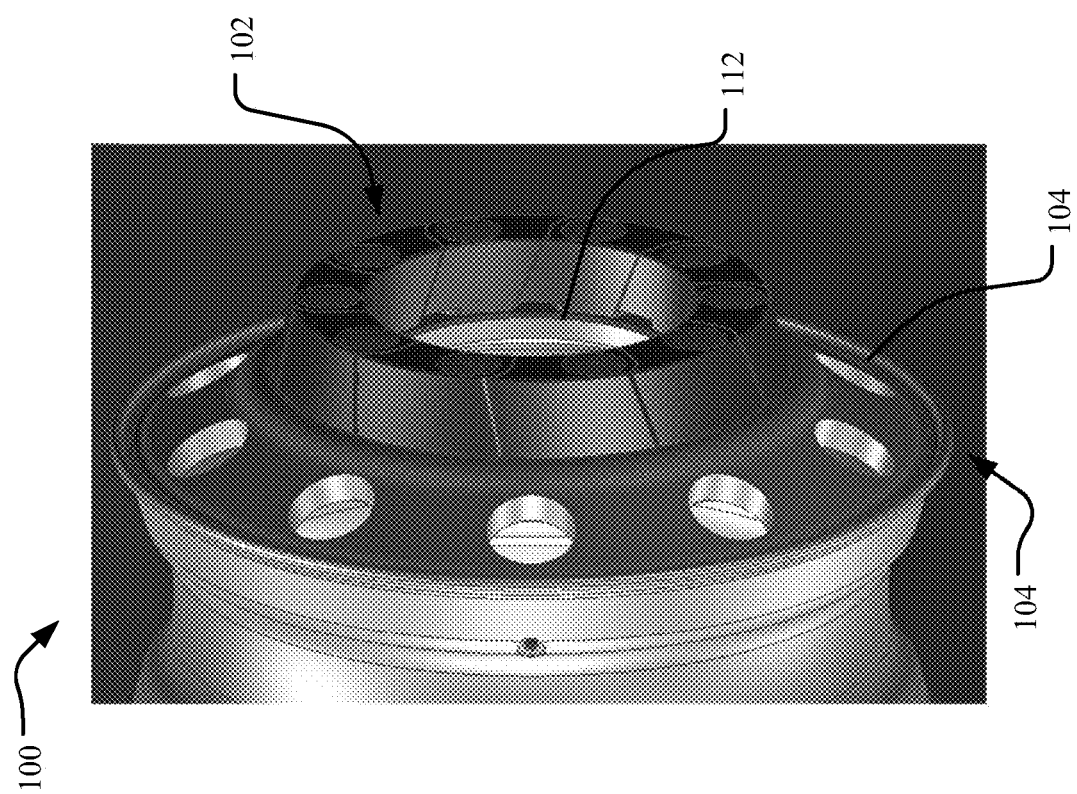
FIGS. 3A-3B depict side and side perspective views, respectively, of the indicator system installed on the wheel.
Figure 3A:
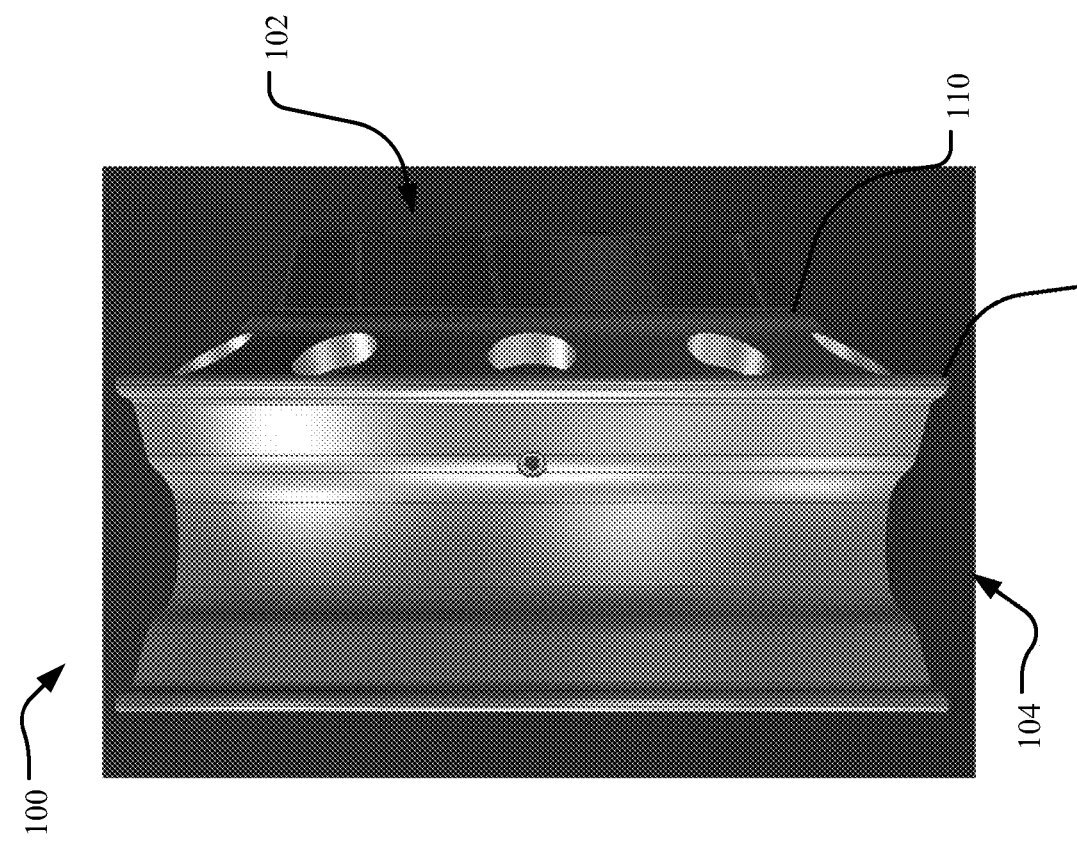

In one implementation, each of the plurality of indicators 102 includes an indicator body 106. Each indicator body 106 may be mounted to a corresponding lug nut using an internal attachment, as reflected in FIG. 1, using a lock 108 extending therethrough, as shown in FIG. 2, and/or through various mounting mechanisms. The indicator bodies 106 are arranged on the wheel 104 in an aerodynamic configuration that reduces drag on the indicator system 100, and increases aerodynamic efficiencies. Further, the indicator bodies 106 house the lug nuts of the wheel, thereby mitigating drag forces on the lug nuts, which lead to lug nut loosening and aerodynamic inefficiencies. For example, when positioned on a front wheel of a vehicle, the indicator system 100 may mitigate lug nut loosening caused by the paddle-wheel-effect.

The wheel 104 includes a surface 110 extending to an inner edge 112 and tapering towards an outer edge 114. The inner edge 112 may be disposed relative to an axle of the wheel 104 and the outer edge 114 relative to a tire of the wheel 104. In one implementation, the aerodynamic configuration includes the indicator bodies 106 mounted to respective lug nuts and positioned on the surface 110 in a concentric ring. The concentric ring may include sides of adjacent indicator bodies 106 disposed in a mating relationship to form a smooth, continuous shape. The continuous shape eliminates pockets, corners, and other areas that would create drag. The mating relationship of the adjacent indicator bodies 106 permits movement of an individual indicator body 106 in response to the corresponding lug nut of that individual indicator body 106 loosening, thereby providing a visual indication that the lug nut is loose. For example, movement of the lug nut, in the form of rotation, may translate to the indicator body 106 in the form of rotation relative to the concentric ring. An indicator body 106 moved to such an indication position 116 from a nominal position that is aligned in the concentric ring of the indicators 102 is readily detectable through a simple visual inspection, as illustrated in FIGS. 4A-4B. Further, the relationship of adjacent indicator bodies 106 may inhibit further rotation of the indicator body 106 in an indication position 116, thereby inhibiting further loosening of the corresponding lug nut. Similarly, the relationship of adjacent indicator bodies 106 is such that rotation of one indicator body 106 will not cause adjacent indicator bodies 106 to rotate and Generally, the indicator system 100 provides various advantages over conventional systems including ease of use and installation and aerodynamic efficiencies. The aerodynamic lug nut indicator system allows for quick installation of the indicator system 100 onto the wheel, as the indicators 102 are self-aligning. More particularly, each indicator 102 is simply mounted to a corresponding lug nut to form the concentric ring. The indicator 102 may be mounted to a lug nut by mounting the indicator body 106 to the lug nut using a sleeve and clamp, a lock, and/or other internal or external mechanisms. When the indicator system 100 is mounted, it is disposed in a compact arrangement, for example in the concentric ring about the surface 110, which does not hinder a user from performing routine inspection of other portions of the wheel, such as routine inspection of the wheel seal. In some cases, the indicator system 100 may include a cover that covers the wheel 104 and other wheel components to further increase aerodynamic efficiency. For example, the wheel cover may extend over the wheel 104 with a circumference corresponding to the outer edge 114.

Figure 5:
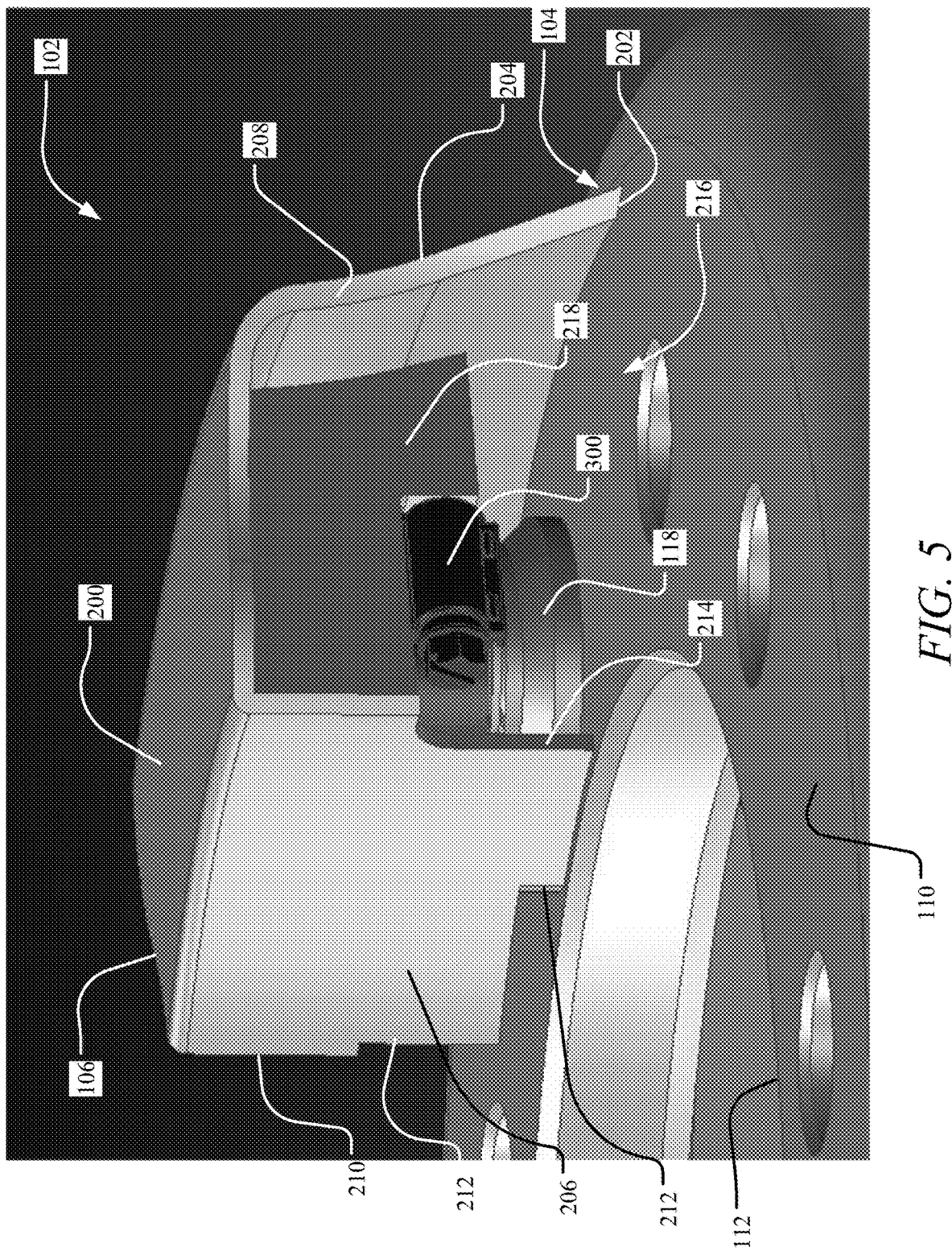
FIG. 5 illustrates a detailed view of an example indicator of the indicator system installed on the wheel.
Figure 6:
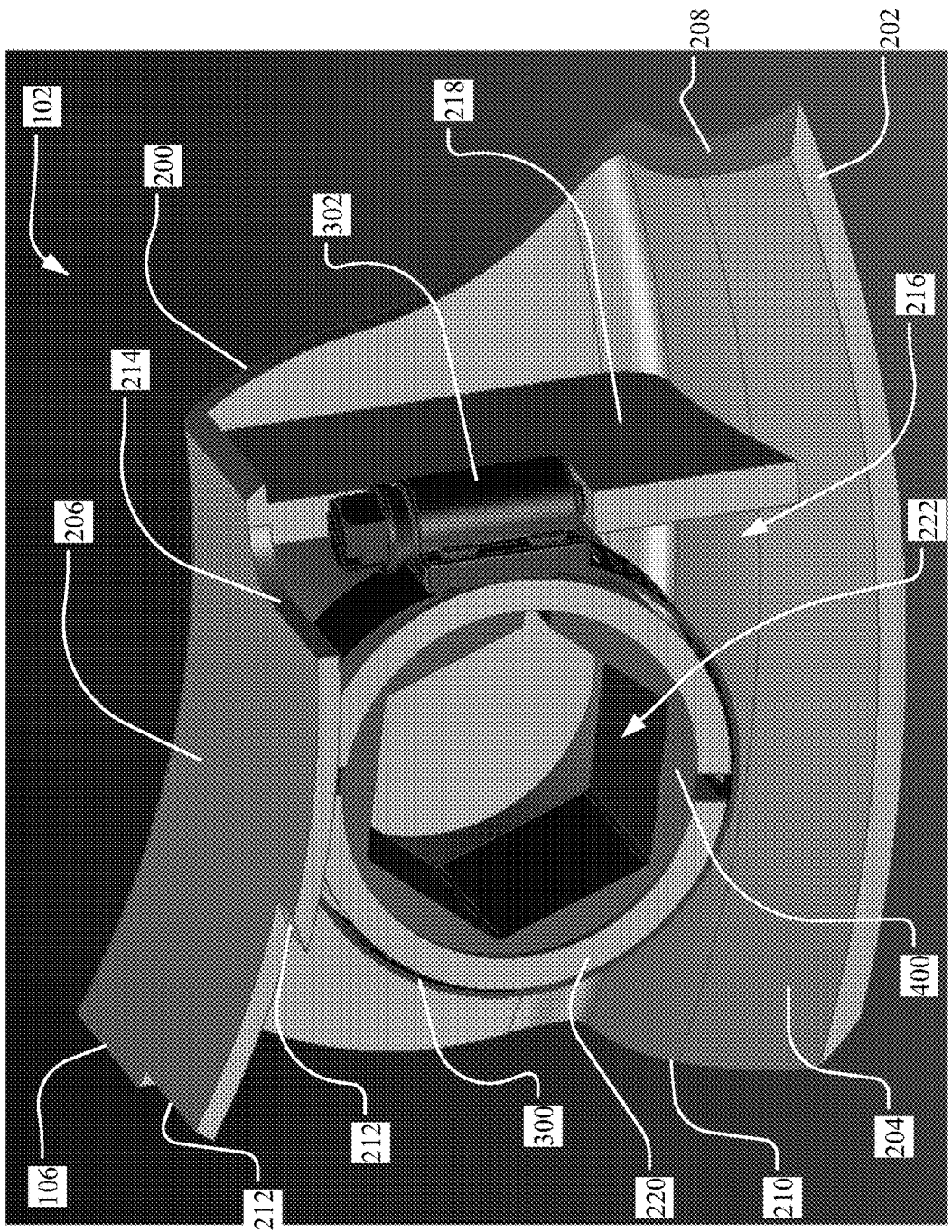
FIG. 6 is a bottom perspective view of the indicator.
Figures 8A, 8B:
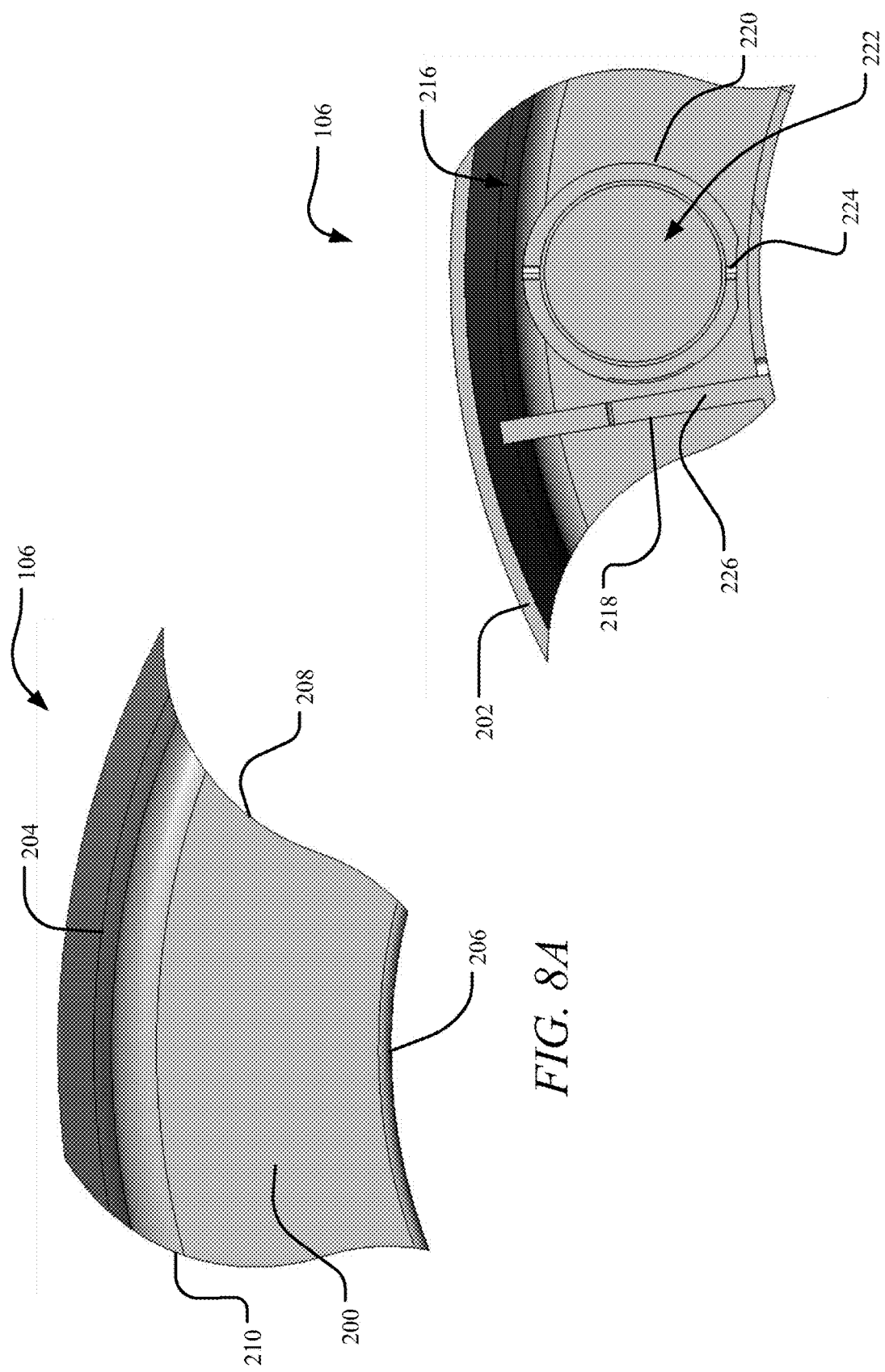
FIGS. 8A-8B depict top and bottom views, respectively, of the indicator body.
Figure 11A:
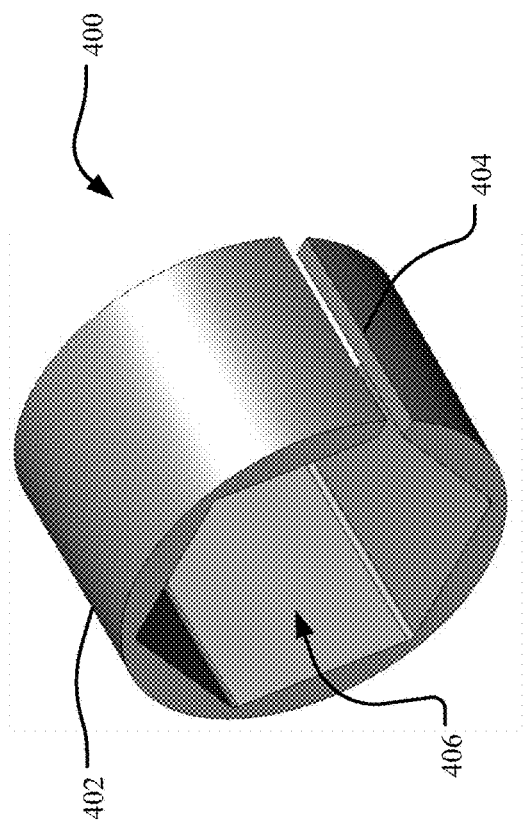
FIGS. 11A-11D show perspective, top (with bottom being a mirror thereof), left side (with front and back being a mirror thereof), and right side views, respectively, of an example sleeve of the indicator.
Figure 11C:
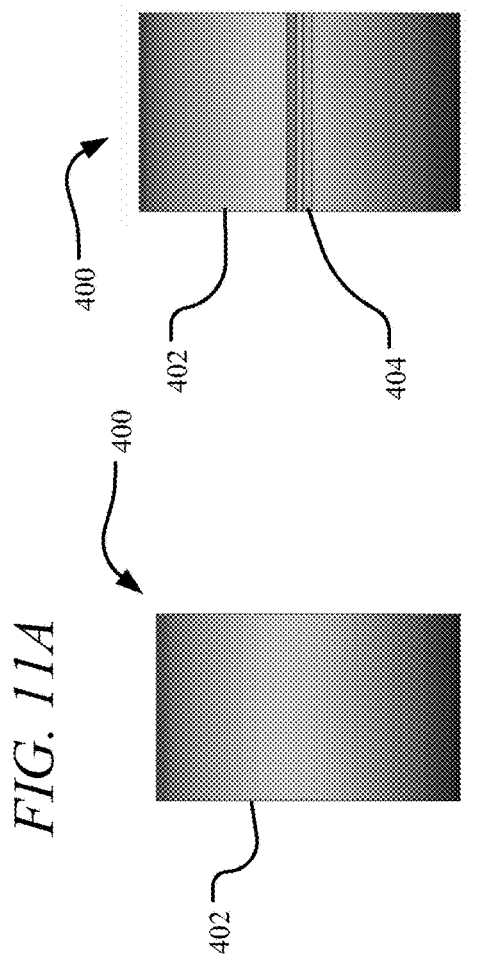
Figure 11D:
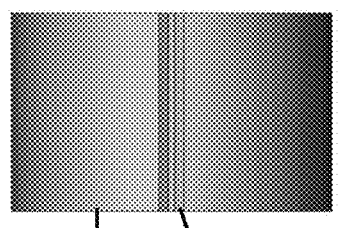
Figure 11B:
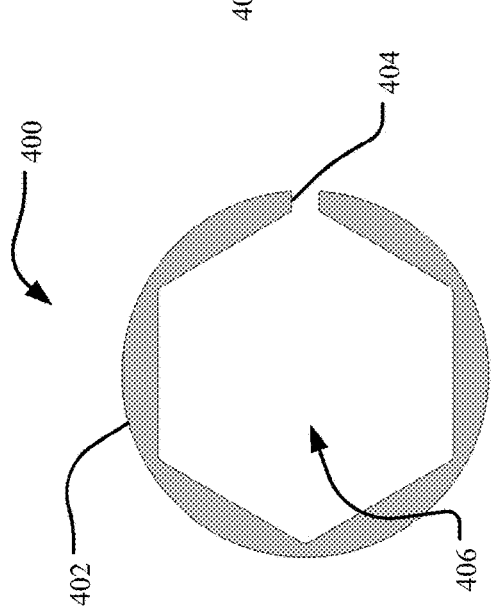

Turning to FIGS. 5-6, in one implementation, the indicator 102 includes the indicator body 106 mounted to a lug nut 118 using a clamp 300 and a sleeve 400. The sleeve 400 is positioned on the lug nut 118 in a mating fit within the indicator body 106 and the clamp 300 secures the indicator body 106 to the sleeve 400 and lug nut 118. The mating fit of the sleeve 400 and lug nut 118, which is tightly secured to the indicator body 106, generates a translation of any movement (e.g., rotation) of the lug nut 118 in the form of a movement (e.g., rotation) of the indicator body 106.

In one implementation, as shown in FIGS. 5-9D, the indicator body 106 includes a top surface 200 disposed opposite a bottom surface 202, which are connected to each other with a front surface 204 disposed opposite a back surface 206. The bottom of the indicator body 106 may be open, such that the bottom surface 202 is in the form of respective bottom edges of the front surface 204 and the back surface 206 that are positioned on the surface 110, when the indicator 102 is mounted to the lug nut 118. The back surface 206 may be disposed relative to the inner edge 112.

The indicator body 106 extends between a first side 208 and a back side 210. The sides 208-210 may be configured to create a mating relationship with the sides of an adjacent indicator body. For example, the first side 208 of one indicator body 106 may be configured to mate with the second side 210 of an adjacent indicator body 106. The mating relationships of the sides of adjacent indicator bodies 106 creates a continuous shape of the concentric ring of indicators 102, with the front surfaces 204 creating an outer surface of the concentric ring, the back surfaces 206 creating an inner surface of the concentric ring, and the top surfaces 202 creating a continuous top surface over the lug nuts. The indicator bodies 106 therefore mate to form a continuous configuration that is shaped to maximize aerodynamic efficiency.

In one implementation, the back surface 206 may include various cutouts 212, which may facilitate movement of the indicator body 106 in response to movement of the lug nut 118 relative to the concentric circle, as well as facilitate installation and removal of the indicator 102. Additionally, the front surface 206 may include an access cutout 214 permitting access to a lock 302 of the clamp 300, as well as other components housed within an interior 216 of the indicator body 106, for example for installation and removal.

A wall 218 may be disposed in the interior 216 of the indicator body 106 to protect a receiver 220 of the indicator body 106, support and position the lock 302 of the clamp 300, and other purposes. The wall 218 may include a wall cutout 226 for receiving and providing access to the lock 302 of the clamp 300. The receiver 220 may extend downwardly from the top surface 202 to form a receiver opening 222 configured to receive the sleeve 400 and the lug nut 118. The receiver 220 may include one or more slits 224 defined therein. The receiver 220 may extend concentrically about an axis.

Turning to FIGS. 10A-10H, in one implementation, the clamp 300 includes a clamp body 304 extending about an axis to define a clamp opening 306. The lock 302 is mounted on the clamp body 304 and configured to tighten the clamp body 300. For example, the lock 302 may include a bolt that when rotated into a lock receiver, tightens the clamp body 304.

As can be understood from FIGS. 11A-11D, in one implementation, the sleeve 400 includes a sleeve body 402 extending about an axis to form a sleeve opening 406. The sleeve body 402 may include a slit 404 extending therethrough, such that the sleeve body 402 extends concentrically between a first end and a second end and longitudinally between a first face and a second face. An outer surface of the sleeve body 402 may be shaped to mate with an inner surface of the receiver 220, and the inner surface of the sleeve body 402 may be shaped to mate with the lug nut 118. For example, the inner surface of the sleeve body 402 may include a plurality of angled surfaces, and the outer surface of the sleeve body 402 may be rounded.

Thus, as shown in FIGS. 5-6, in one implementation, to mount the lug nut 118 to the indicator 102, the lug nut 118 may be positioned within the sleeve opening 406, such that the surfaces of the lug nut 118 mate with the inner surface of the sleeve body 402. The sleeve body 402 is received in the receiver opening 222, with the outer surface of the sleeve body 402 mating with the inner surface of the receiver 220. The receiver 220 is positioned within the clamp opening 306, such that the clamp body 304 extends about an outer surface of the receiver 220 and the axes of the clamp 300, the sleeve 400, and the receiver 220 are aligned. The lock 302 tightens the clamp body 302 against the receiver 220, and therefore the sleeve 400 and the lug nut 118, mounting the lug nut 118 to the indicator body 106 in a translational relationship. As described herein, the translational relationships translates any movement of the lug nut 118 to the indicator body 106 to provide a visual indication that the lug nut 118 is loose.

Figure 12:
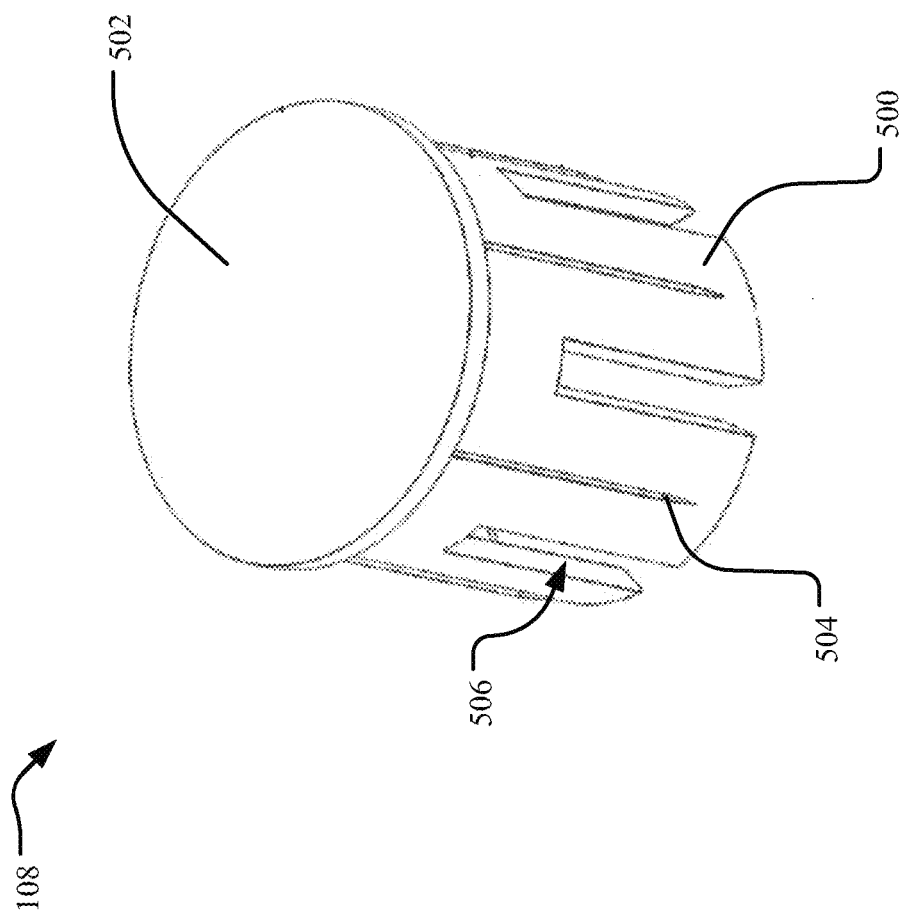
FIG. 12 illustrates an example lock of an indicator.

In one implementation, in place of the clamp 300 and the sleeve 400, the lock 108 may be used to secure the lug nut 118 to the indicator body 106 in a translational relationship. As shown in FIG. 12, the lock 108 may include a lock body 500 extending from a cap 502. The lock body 500 may include a plurality of slots 506 to form a series of flaps having ribs 504. The lock body 500 may be inserted through an opening in the top surface 200 of the indicator body 106 into the receiver 220 over the lug nut 118, with the flaps of the lock body 500 and the ribs 504 creating an interference fit between the lug nut 118 and the indicator body 106, respectively.

During assembly and use, each flap may compress towards a center of the lock body 500 as a result of a combination of a flexibility of the lock 108 and the plurality of slots 506. The plurality of slots 506 result in a hinge formed at a top of each flap, where the flap may bend. Such compression of each flap collectively compresses against lug nut 118 to lock the lug nut 118 within the lock 108 when the lock 108 is received in an opening in the top surface 200 of the indicator body 106. In other words, an interference fit between the lug nut 118 and an inner surface of each flap locks the lug nut 118 within the lock 108. The plurality of ribs 506 creates an interference fit between the lock body 500 and the receiver 220. Such an interference fit between the lock 108 and the receiver 220 combined with the interference fit between the lock 108 and the lug nut 118 translates movement of the lug nut 118 to the indicator body 106 via the lock 108, forming the translational relationship. The cap 502 may be generally flush with the top surface 200, thus maximizing aerodynamic efficiency of the indicator system 100.

Figure 13:
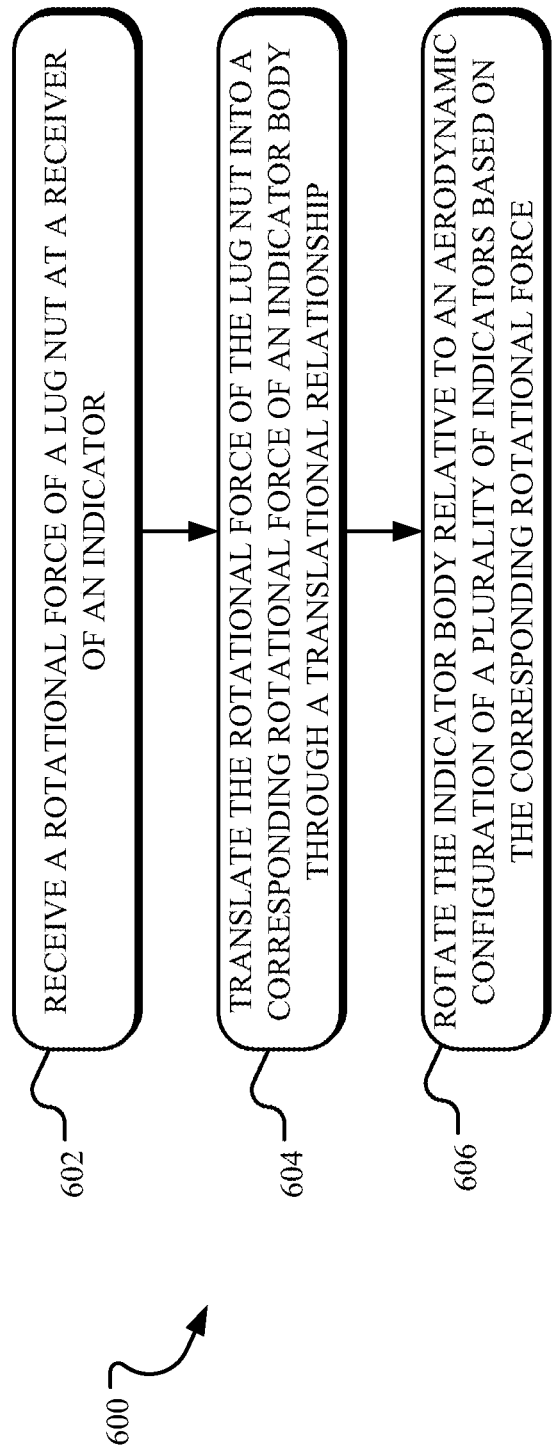
FIG. 13 illustrates example operations for indicating a loose lug nut.

Turning to FIG. 13, example operations 600 for indicating a loose lug nut are shown. In one implementation, an operation 602 receives a rotational force of a lug nut of a wheel of a vehicle at a receiver of an indicator. The indicator is included in a plurality of indicators arranged in an aerodynamic configuration. An operation 604 translates the rotational force of the lug nut into a corresponding rotational force of an indicator body of the indicator through a translational relationship of the lug nut with the indicator. An operation 606 rotates the indicator body of the indicator relative to the aerodynamic configuration of the plurality of indicators based on the corresponding rotational force.

Figure 14:
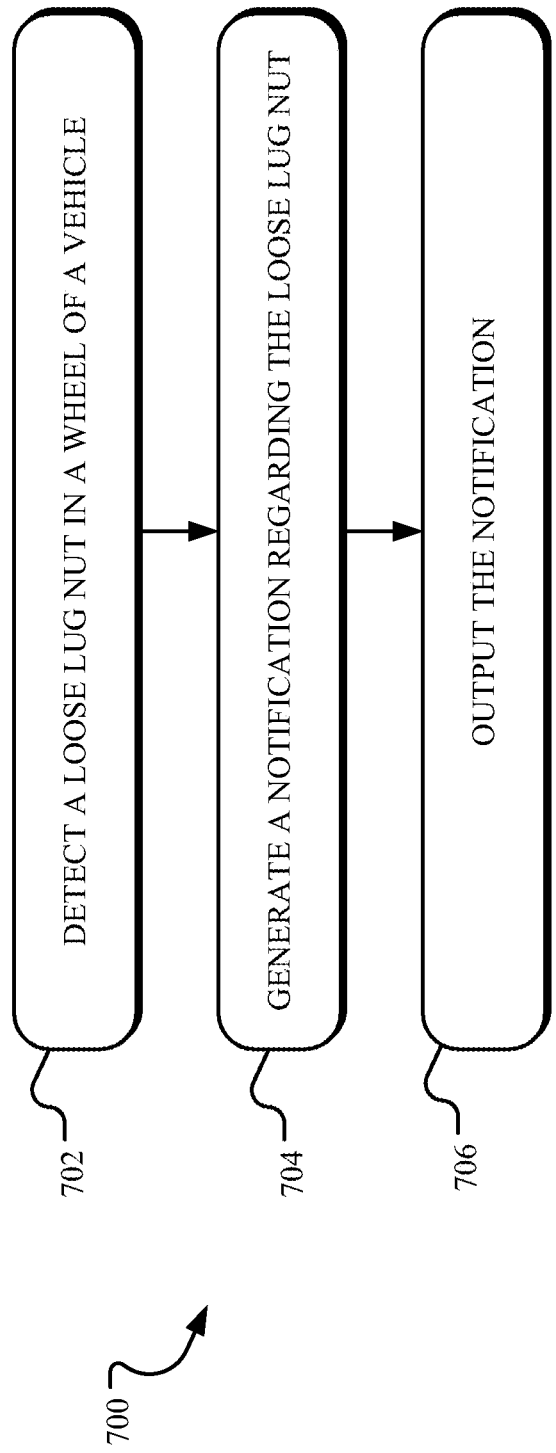
FIG. 14 illustrates example operations for tracking lug nut loosening.

FIG. 14 illustrates example operations 700 for tracking lug nut loosening. In one implementation, an operation 702 detects a loose lug nut in a wheel of a vehicle. The loose lug nut detected using a sensor system of an indication system. The indication system has an indicator associated with the loose lug nut. An operation 704 generates a notification regarding the loose lug nut, and an operation 706 outputs the notification.

Figure 15:
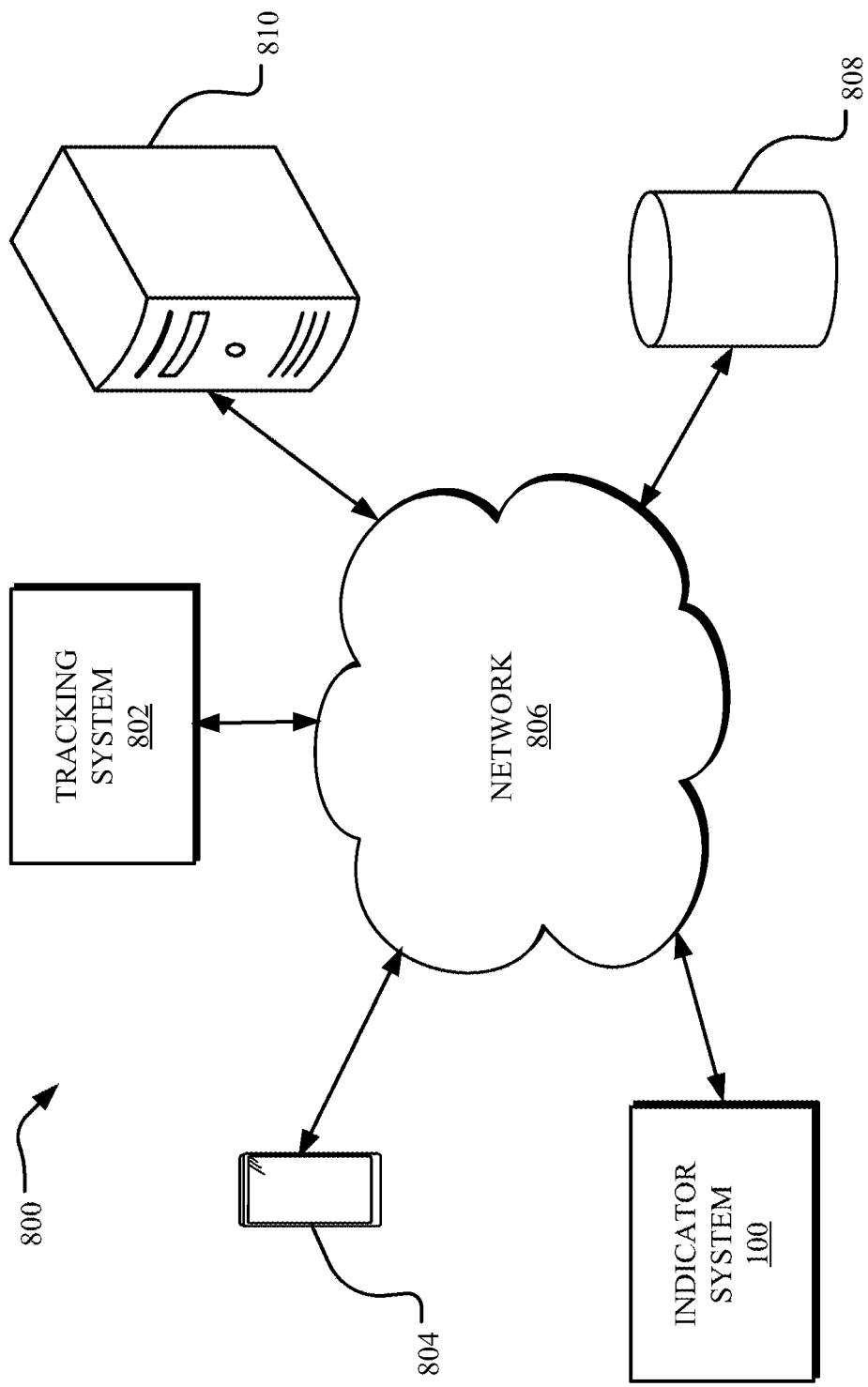
FIG. 15 shows an example network environment that may implement various aspects of a lug nut loosening tracking system.

Referring to FIG. 15, in one implementation, one or more of the indicator systems 100 remotely notifies a user that a lug nut of a vehicle is loose. The indicator system 100 may include a sensor system that detects when one or more of the indicators move in response to lug nut loosening. For example, the sensors may include a connector (e.g., circuit) between each indicator 102 to sense a break if one or more of the indicators 102 rotate in response to a loose lug nut. The sensor system may detect which of the lug nuts is loose based on a detected movement of one of the indicators 102.

In some cases, the sensor system generates and outputs a notification of a loose lug nut. For example, the notification may be an audible alarm. Alternatively or additionally, the sensor system may communicate a notification to a user device 804 in response to detecting movement of one or more indicators 102. The sensor system may communicate a basic notification in the form of an alert directly to the user device 804, for example, via radio frequency, Bluetooth™, and/or the like. On the other hand, the notification may include an identification of which lug nut is loose, a degree of looseness (e.g., relative to a threshold), an identification of the wheel having the loose lug nut, and/or the like, which may be communicated directly or indirectly to the user device 804. In one implementation, a tracking system 802 is accessed via the user device 804, which provides notifications corresponding to one or more indicator systems 100 and in some cases, analytics.

In one implementation, a user accesses and interacts with the tracking system 802 in a network environment 800 using the user device 804 to access, generate, or otherwise interact with notifications, analytics, and/or other information or services via a network 806. The user device 804 is generally any form of computing device capable of interacting with the network 806, such as a personal computer, terminal, workstation, desktop computer, portable computer, mobile device, smartphone, tablet, multimedia console, etc., and/or interacting with the sensor system of the indicator system 100. The network 806 may be used by one or more computing or data storage devices (e.g., one or more databases 808 or other computing units described herein) for implementing the tracking system 802 and other services, applications, or modules in the network environment 800. The notifications, analytics, user data, software, and other information utilized by the tracking system 802 may be stored in and accessed from the one or more databases 808.

In one implementation, the network environment 800 includes at least one server 810 hosting a website or an application that the user may visit to access the tracking system 802 and/or other network components of the network environment 800. The server 810 may be a single server, a plurality of servers with each such server being a physical server or a virtual machine, or a collection of both physical servers and virtual machines. In another implementation, a cloud hosts one or more components of the network environment 800. The user devices 804, the server 810, and other resources connected to the network 806 may access one or more other servers to access to one or more websites, applications, web services interfaces, storage devices, computing devices, or the like that are used for tracking loose lug nuts, analytics, and related services. The server 806 may also host a search engine that the tracking system 802 uses for accessing, searching for, and modifying notifications, analytics, underlying data, and other data, as well as for providing loose lug nut tracking services, as described herein.

In one implementation, the notifications may be sent to a driver associated with the vehicle utilizing the indicator system 100. The notifications may be sent according to priority level. For example, if a lug nut is detected by the sensor system of the indicator system 100 to be looser than a threshold value, the notification may be sent in an urgent capacity encouraging the driver to stop the vehicle to address the loose lug nut, and thereby avoid a potential hazardous condition. On the other hand, if the looseness of the lug nut is detected to be below the threshold value, the notification may be provided to the driver at a lower priority level for addressing at a future next stop.

In some cases, the notifications may be alternatively or additionally sent to a remote administrator, for example, an operator of a truck company that manages a plurality of trucks and drivers. The remote administrator may automatically or manually analyze the notifications and contact corresponding drivers with instructions on how and when to address loose lug nuts, as appropriate. The tracking system 802 may further generate analytics, including trends for vehicle, driver, route, wheel type, and/or the like. For example, the analytics may indicate whether a particular driver, vehicle, wheel type, route, and/or the like are prone to instances of loose lug nuts, for addressing.

Figure 16:
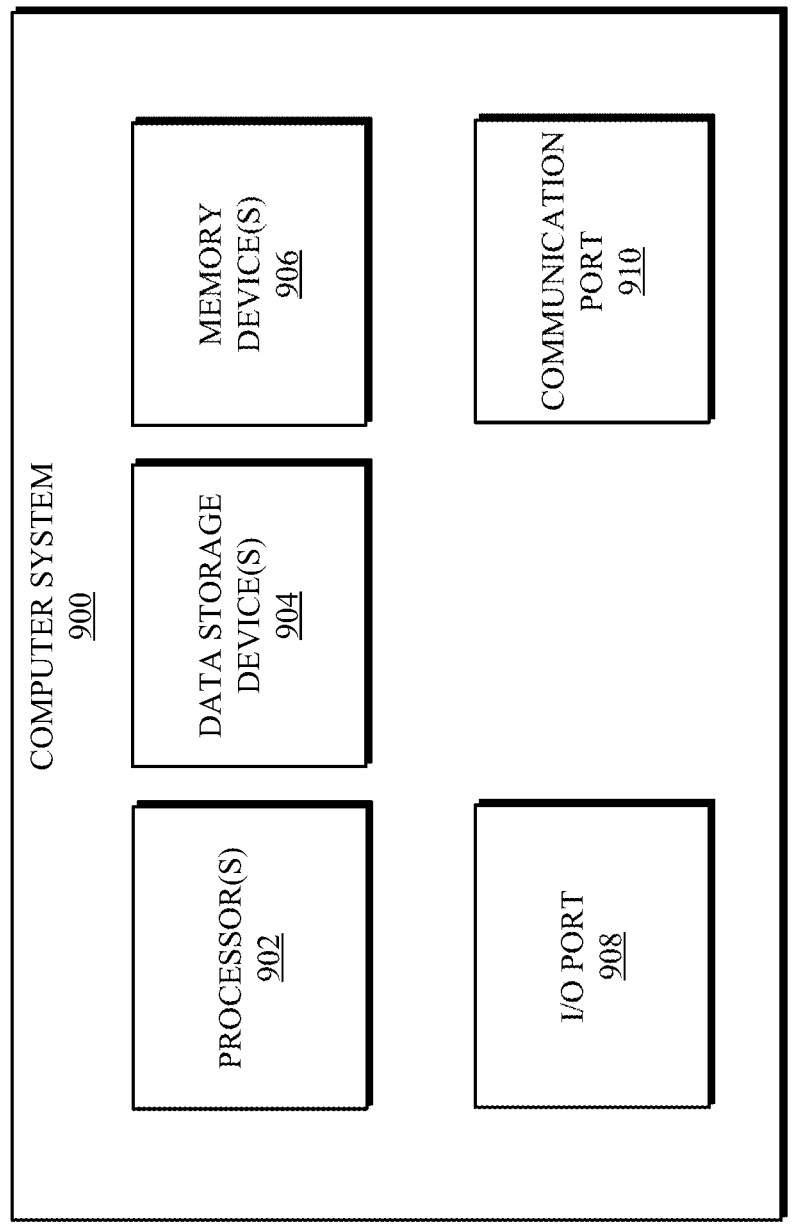
FIG. 16 is an example computing system that may implement various systems and methods discussed herein.

Referring to FIG. 16, a detailed description of an example computing system 900 having one or more computing units that may implement various systems and methods discussed herein is provided. The computing system 900 may be applicable to the tracking system 802, the user device 804, the indicator system 100 (e.g., the sensor system of the indicator system 100), and other computing or network devices. It will be appreciated that specific implementations of these devices may be of differing possible specific computing architectures not all of which are specifically discussed herein but will be understood by those of ordinary skill in the art.

The computer system 900 may be a computing system is capable of executing a computer program product to execute a computer process. Data and program files may be input to the computer system 900, which reads the files and executes the programs therein. Some of the elements of the computer system 900 are shown in FIG. 16, including one or more hardware processors 902, one or more data storage devices 904, one or more memory devices 908, and/or one or more ports 908-910. Additionally, other elements that will be recognized by those skilled in the art may be included in the computing system 900 but are not explicitly depicted in FIG. 16 or discussed further herein. Various elements of the computer system 900 may communicate with one another by way of one or more communication buses, point-to-point communication paths, or other communication means not explicitly depicted in FIG. 16.

The processor 902 may include, for example, a central processing unit (CPU), a graphics processing unit (GPU), a microprocessor, a microcontroller, a digital signal processor (DSP), and/or one or more internal levels of cache. There may be one or more processors 902, such that the processor 902 comprises a single central-processing unit, or a plurality of processing units capable of executing instructions and performing operations in parallel with each other, commonly referred to as a parallel processing environment.

The computer system 900 may be a conventional computer, a distributed computer, or any other type of computer, such as one or more external computers made available via a cloud computing architecture. The presently described technology is optionally implemented in software stored on the data stored device(s) 904, stored on the memory device (s) 906, and/or communicated via one or more of the ports 908-910, thereby transforming the computer system 900 in FIG. 16 to a special purpose machine for implementing the operations described herein. Examples of the computer system 900 include personal computers, terminals, workstations, mobile phones, tablets, laptops, personal computers, multimedia consoles, gaming consoles, set top boxes, and the like.

The one or more data storage devices 904 may include any non-volatile data storage device capable of storing data generated or employed within the computing system 900, such as computer executable instructions for performing a computer process, which may include instructions of both application programs and an operating system (OS) that manages the various components of the computing system 900. The data storage devices 904 may include, without limitation, magnetic disk drives, optical disk drives, solid state drives (SSDs), flash drives, and the like. The data storage devices 904 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 906 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 904 and/or the memory devices 906, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 900 includes one or more ports, such as an input/output (I/O) port 908 and a communication port 910, for communicating with other computing, network, or vehicle devices. It will be appreciated that the ports 908-910 may be combined or separate and that more or fewer ports may be included in the computer system 900.

The I/O port 908 may be connected to an I/O device, or other device, by which information is input to or output from the computing system 900. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 900 via the I/O port 908. Similarly, the output devices may convert electrical signals received from computing system 900 via the I/O port 908 into signals that may be sensed as output by a human, such as sound, light, and/or touch. The input device may be an alphanumeric input device, including alphanumeric and other keys for communicating information and/or command selections to the processor 902 via the I/O port 908. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 900 via the I/O port 908. For example, an electrical signal generated within the computing system 900 may be converted to another type of signal, and/or vice-versa. In one implementation, the environment transducer devices sense characteristics or aspects of an environment local to or remote from the computing device 900, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 900, such as, physical movement of some object (e.g., a mechanical actuator), heating or cooling of a substance, adding a chemical substance, and/or the like.

In one implementation, a communication port 910 is connected to a network by way of which the computer system 900 may receive network data useful in executing the methods and systems set out herein as well as transmitting information and network configuration changes determined thereby. Stated differently, the communication port 910 connects the computer system 900 to one or more communication interface devices configured to transmit and/or receive information between the computing system 900 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 910 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 910 may communicate with an antenna or other link for electromagnetic signal transmission and/or reception.

In an example implementation, operations for tracking lug nut loosening and software and other modules and services may be embodied by instructions stored on the data storage devices 904 and/or the memory devices 906 and executed by the processor 902.

The system set forth in FIG. 9 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for loose lug nut identification and mitigation, the method comprising:
   receiving a rotational force of a lug nut of a wheel of a vehicle at a receiver of an indicator, the indicator being included in a plurality of indicators arranged in an aerodynamic configuration, a clamp engaging an external surface of the receiver to secure a sleeve and the lug nut within the receiver;
   translating the rotational force of the lug nut into a corresponding rotational force of an indicator body of the indicator through a translational relationship of the lug nut with the indicator; and
   rotating the indicator body of the indicator relative to the aerodynamic configuration of the plurality of indicators based on the corresponding rotational force.

2. The method of claim 1, wherein the aerodynamic configuration includes the plurality of indicators arranged in a concentric ring.

3. The method of claim 2, wherein the concentric ring is formed based on a mating relationship of sides of the indicator body of the indicator with corresponding sides of adjacent indicators of the plurality of indicators.

4. The method of claim 1, wherein the translational relationship of the lug nut with the indicator is formed based on a mating fit of the lug nut within the receiver of the indicator.

5. The method of claim 4, wherein the mating fit is created using the sleeve mated to the lug nut within the receiver.

6. The method of claim 4, wherein the mating fit is created by an interference fit of a lock with the lug nut and the receiver.

7. The method of claim 1, further comprising:
   detecting the indicator body of the indicator rotating based on the corresponding rotational force; and
   generating a notification regarding the lug nut being loose in response to detecting the indicator body of the indicator rotating.

8. The method of claim 7, further comprising:
   outputting the notification as an audible alert.

9. The method of claim 7, further comprising:
   communicating the notification to a user device.

10. The method of claim 7, wherein the notification includes an identification of a location of the lug nut.

11. One or more tangible non-transitory computer-readable storage media storing computer-executable instructions for performing a computer process on a computing system, the computer process comprising:
   detecting a loose lug nut in a wheel of a vehicle, the loose lug nut detected using an indication system, the indication system having an indicator associated with the loose lug nut and a circuit formed between the indicator and an adjacent indicator, the loose lug nut detected in response to a rotation of at least one of the indicator or the adjacent indicator, the rotation causing the circuit to break;
   generating a notification regarding the loose lug nut; and
   outputting the notification.

12. The one or more tangible non-transitory computer-readable storage media of claim 11, wherein the indicator is rotated based on a translational relationship of the indicator with the loose lug nut.

13. The one or more tangible non-transitory computer-readable storage media of claim 11, wherein the notification is output as an audible alert.

14. The one or more tangible non-transitory computer-readable storage media of claim 11, wherein the notification is output as a communication to a user device.

15. The one or more tangible non-transitory computer-readable storage media of claim 11, wherein the notification includes an identification of a location of the loose lug nut.

16. The one or more tangible non-transitory computer-readable storage media of claim 11, wherein a trend of loose lug nuts for at least one of a driver, a vehicle, a route, or a wheel type is generated based on the notification.

17. A system for indicating a lug nut that is loose, the lug nut corresponding to a wheel of a vehicle, the system comprising:
   an indicator body of an indicator, the indicator body having a top surface connecting a front surface and a back surface;
   a first side of the indicator body disposed opposite a second side of the indicator body; and
   a receiver extending from the top surface into an interior of the indicator body, the receiver configured to form a translational relationship of the lug nut with the indicator through a mating fit of the lug nut within the receiver, the mating fit created by a clamp engaging an external surface of the receiver to secure a sleeve and the lug nut within the receiver, the translational relationship generating a corresponding rotation of the indicator body in response to a rotation of the lug nut, the corresponding rotation of the indicator body providing an indication that the lug nut is loose.

18. The system of claim 17, wherein each of the first side and the second side of the indicator body is in a mating relationship with corresponding sides of an adjacent indicator.

19. The system of claim 18, wherein a plurality of indicators, including the indicator and the adjacent indicator, are arranged in an aerodynamic configuration.

20. The system of claim 19, wherein the aerodynamic configuration is a concentric ring.

* * * * *